Figure 1:
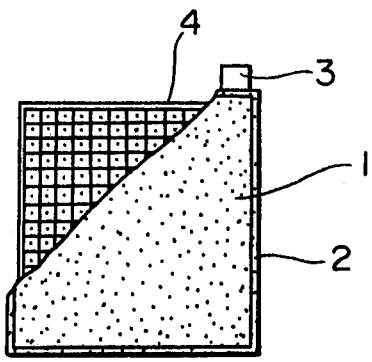

United States Patent [19]

Honda et al.

[11] 4,024,213

[45] May 17, 1977

[54] METHOD FOR PREPARING A POROUS STRUCTURE BY STRETCHING A RESIN SHEET USEFUL AS AN ELECTRODE SEPARATOR

[75] Inventors: Seiichirou Honda, Kawanishi; Hiroyoshi Hata, Osaka; Yosimasa Simura, Osaka; Soichi Une, Osaka, all of Japan

[73] Assignee: Sekisui Kagaku Kogyo Kabushiki Kaisha, Osaka, Japan

[22] Filed: Feb. 19, 1975

[21] Appl. No.: 550,907

Related U.S. Application Data

[62] Division of Ser. No. 455,726, March 28, 1974, Pat. No. 3,967,978.

[30] Foreign Application Priority Data

| Mar. 30, 1973 | Japan | 48-36930 |
| Mar. 30, 1973 | Japan | 48-36931 |
| Apr. 5, 1973 | Japan | 48-39229 |
| Apr. 5, 1973 | Japan | 48-39230 |

[52] U.S. Cl. .................. 264/154; 264/DIG. 47
[51] Int. Cl.² .............. B29D 27/00; B29D 7/24
[58] Field of Search ............ 264/41, DIG. 47, 154, 264/145, 146

[56] References Cited

UNITED STATES PATENTS

| 3,247,025 | 4/1966 | Beaulieu | 136/146 |
| 3,351,495 | 11/1967 | Larsen et al. | 264/41 |
| 3,536,796 | 10/1970 | Rock | 264/49 |
| 3,551,538 | 12/1970 | Yamamoto et al. | 264/175 |
| 3,679,538 | 7/1972 | Druin et al. | 264/DIG. 47 |
| 3,725,520 | 4/1973 | Suzuki | 264/41 |
| 3,839,516 | 10/1974 | Williams et al. | 264/41 |
| 3,853,601 | 12/1974 | Taskier | 136/146 |
| 3,903,234 | 9/1975 | Ikeda et al. | 264/DIG. 47 |

Primary Examiner—Robert F. White
Assistant Examiner—James B. Lowe
Attorney, Agent, or Firm—Wenderoth, Lind & Ponack

[57] ABSTRACT

A resin sheet having a porous layered structure useful as an electrode separator for electric cells, said sheet comprising (a) an olefin resin, (b) a finely divided inorganic substance, and (c) at least one substance selected from the group consisting of (i) a water-swellable thermoplastic resin, (ii) a water-insoluble or difficultly water-soluble hydrophilic nonionic surface active agent, and (iii) a water-insoluble difficultly water-soluble hydrophilic anionic surface active agent, said sheet including fine pores arranged throughout its cross section in a plurality of layers, at least some of them forming open cells.

The above sheet is prepared by a process comprising fabricating a mixture containing the above components (a), (b) and (c) into a sheet, and stretching the sheet in at least one direction.

8 Claims, 2 Drawing Figures

METHOD FOR PREPARING A POROUS STRUCTURE BY STRETCHING A RESIN SHEET USEFUL AS AN ELECTRODE SEPARATOR

This is a division, of application Ser. No. 455,726, filed Mar. 28, 1974, now U.S. Pat. No. 3,967,978.

This invention relates to a novel resin sheet having a porous layered structure which is useful as an electrode separator for electric cells, and to a process for producing such a resin sheet, and also to the use of the resin sheet for electrode plates of electric cells.

An active substance is formed on the surface of electrodes during the use of electric cells. When the active substance drops off, self-discharge is accelerated, and short-circuit between electrode plates often takes place to reduce the performance of the cells leading to the shortening of their lifetime. Various attempts have been proposed heretofore with a view to preventing the drop-off of the active substance. According to one of such prior attempts to prevent the short-circuit of anode and cathode plates in an electrolytic solution in the cell, to maintain the distance between the two electrode plates at a certain predetermined value, and to prevent the drop-off of the active substance, a plate-like electrode separator is interposed between two adjacent electrode plates. Examples of the generally used electrode separator are a wooden separator; a microporous plastic separator obtained by forming a sheet-like material from a synthetic resin and a fine powder of a water-soluble substance, and washing it with water to remove the water-soluble substance and thus form micropores; a separator made of reinforced fibers which is obtained by impregnating a good quality pulp or paper with a phenolic resin solution, and curing it by heating; and a separator made of glass mat which is obtained by laminating glass fibers in the form of felt or mat, and cementing them with an adhesive composed to such a material as gelatin, starch or a synthetic resin.

The wooden electrode separator must be pretreated with an alkaline or acidic solution before use because it permits poor penetration of the electrolytic solution, and noxious substances are dissolved out. Furthermore, in order to maintain the strength of the wooden separator, it must be made thick, and consequently, it cannot meet the requirement of the market for providing cells which are light in weight and small in volume.

With regard to the microporous plastic separator, it is generally difficult to render the plastic sufficiently microporous by the dissolving of the water-soluble substance. Such an electrode separator with an insufficient microporous structure does not permit sufficient penetration of the electrolytic solution, and the electrode plates are not fully utilized at the time of charging and discharging to cause a low electricity generating power. Because of these defects, the microporous plastic separator does not find a wide range of applications nowadays.

On the other hand, the electrode separator made of reinforced fibers has the defect of having poor physical properties such as acid resistance and oxidation resistance and a short lifetime.

The glass mat separator cannot permit a complete prevention of the drop-off of the active substance, and the permeation of the electrolytic solution is poor because of its insufficient microporous structure. Furthermore, reaction does not take place fully on the electrode plates at the time of charging and discharging, and the electricity generating power is low. It also causes short-circuit when used alone. When it is used conjointly with another electrode separator, the separator becomes thick, and the electric cell becomes largesized, and heavy, and cannot meet the requirements of the market.

In addition to low porosity, these conventional electrode separators have poor affinity for water present in the electrolytic solution, low permeation of the electrolytic solution, and high electric resistance in the electrolytic solution. Furthermore, the electrode plates shrink or swell at the time of charging and discharging, and the firm contact between the surfaces of the electrodes and the separator is reduced. Accordingly, the active substance tends to drop-off, and air bubbles occur between the surfaces of the electrode plates owing to the gas generated at the time of charging, resulting in an increase in electric resistance.

Thus, the conventional electrode separators for electric cells have various defects exemplified above, and none has proved satisfactory in the desired properties. It has therefore been desired previously to provide electrode separators for electric cells, which can meet all of the requirements, such as superior electric insulation, the ability to prevent the drop-off of particles of an active substance in electrodes and its passage therethrough, the freedom from dissolving out objectionable substances in the electrolytic solution, good stability to acid or alkali in the electrolytic solution, superior mechanical strength, high porosity, the ability to permit an easy permeation of the electrolytic solution, low electric resistance, and small-size and light weight of the electrolytic cells.

It has now been found surprisingly that a resin sheet having a porous layered structure which is produced from a mixture comprising an olefin resin as a base and at least one substance selected from water-swellable thermoplastic resins, and water-insoluble or difficultly water-soluble hydrophilic nonionic or anionic surface active agents is very suitable as an electrode for electric cells.

According to this invention, there is provided a resin sheet having a porous layered structure useful as an electrode separator for electric cells, said sheet comprising (a) an olefin resin, (b) a finely divided inorganic substance and (c) at least one substance selected from the group consisting of water-swellable thermoplastic resins, water-insoluble or difficulty water-soluble hydrophilic nonionic surface active agents and water-insoluble or difficultly water-soluble surface active agents, said sheet including fine pores arranged throughout its cross section in a plurality of layers, at least some of them forming open cells.

The resin sheet of the invention contains an olefin resin as a base. The olefin resin that can be used in this invention can be any olefin resin which has film forming ability, and may contain a straight chain or branched chain, or may be crystalline or non-crystalline. Examples of suitable olefin resins are homopolymers of olefins such as polyethylene, polypropylene, polybutene, polybutylene, or poly(4-methyl pentene-1), copolymers of olefins with other monomers copolymerizable therewith such as an ethylene-propylene copolymer, an ethylene-butene copolymer, an ethylene-vinyl acetate copolymer, an ethylene-vinyl chloride copolymer, a propylene-butene copolymer, or an ethylene-ethyl acrylate copolymer, or modified olefins resins such as chlorinated polyethylene, or chlorosulfonated polyethylene. Of these, polyethylene, isotactic polypropylene, ethylene-propylene copolymer, ethylene-vinyl acetate copolymer, and chlorinated polyethylene are especially preferred.

The ratio of the olefin monomer to the copolymerizable monomer to form the copolymer is at least 50% by weight.

The above olefin resins may be used singly or in combination of two or more.

The finely divided inorganic substance to be added to the olefin resin as a filler can be any filler substance which is stable to acid or alkali in the electrolytic solution of an electric cell. Examples of the inorganic substance are silica powder, diatomaceous earth powder, carbon powder, mica powder, coal powder, graphite powder, barium sulfate powder, calcium hydroxide powder, magnesium hydroxide powder, and barium hydroxide powder. Of these, silica powder, diatomaceous earth powder, carbon powder, magnesium hydroxide, and calcium hydroxide are especially preferred. These filler substances can be used either alone or in combination of two or more. The particle diameter of the inorganic substance is not critical, but too large particles are not preferred. Thus, usually, the inorganic substance used in this invention has an average particle diameter of not more than 20 microns, preferably not more than 5 microns.

The amount of the finely divided inorganic substance is not strictly limited, but the suitable amount is 5 to 300 parts by weight per 100 parts by weight of the olefin resin. Most suitably, it is used in an amount of 10 to 200 parts by weight per 100 parts by weight of the olefin resin.

The use of such a finely divided inorganic substance makes it possible to produce a porous layered structure suitable as an electrode separator when a sheet formed from a mixture consisting of (a) the olefin resin, (b) the finely divided inorganic substance, and (c) the water-swellable thermoplastic polymer or the water-insoluble or difficultly water-soluble hydrophilic nonionic or anionic surface active agent is stretched.

The greatest characteristic feature of the resin sheet of this invention is that the porous layered structure so formed is a basis for exhibiting the function of an electrode separator, and in order to enhance the performance of the resin sheet as an electrode separator for electric-cells, the water-swellable thermoplastic resin or the water-insoluble or difficultly water-soluble hydrophilic nonionic or anionic surface active agent is incorporated in the olefin resin.

Suitable water-swellable thermoplastic resin include, for example, a homopolymer of ethylene oxide or a copolymer of ethylene oxide with another monomer copolymerizable therewith which on contact with water, absorbs water and swells; and a homopolymer of acrylic acid, a homopolymer of methacrylic acid, or a copolymer of acrylic acid or methacrylic acid and another monomer copolymerizable therewith which on contact with water, absorbs it and swells. These polymers are used either alone or in admixture of two or more. Most suitably, these polymers should swell on contact with water but not dissolve in water. However, those which on contact with water, absorb it and swell can also be used in this invention. Those which dissolve in water to a great extent are not desirable for use in the resin sheet of this invention because they change the composition of the electrolytic solution and are likely to participate in charging and discharging reaction.

Thus, the water-swellable theremoplastic resin suitably used in this invention has a water-swellability factor of 2 to 50, preferably 5 to 40. The water-swellability factor is defined as the factor of the weight of the resin which has absorbed water to saturation, as against its original weight before water absorption.

Typical water-swellable thermoplastic polymer are widely available under the tradenames "AQUAPRENE" (the product of Meisei Chemical Co., Ltd., Japan), and "HYDRON" (the product of Kyowa Gas Chemical Co., Ltd., Japan), and can be suitably used in the present invention.

The suitable amount of the water-swellable thermoplastic polymer is 4 to 100 parts by weight, preferably 5 to 70 parts by weight, per 100 parts by weight of the olefin resin. The use of the water-swellable thermoplastic polymer makes it possible to improve the hydrophilicity of the resin sheet of this invention, permit an easy permeation of the electrolytic solution, and reduce the electric resistance of the sheet in the electrolytic solution.

When the water-swellable thermoplastic polymer present in the resin sheet is swollen with water in the electrolytic solution, the pore diameter of the micropores forming the microporous layered structure decreases, and the passage of the active substance can be inhibited without an increase in the electric resistance of the sheet in the electrolytic solution.

The nonionic surface active agent should be moderately compatible with the olefin risin; otherwise, there is no particular restriction on it. Examples of suitable nonionic surfactants are polyethylene glycol esters, ethers and alkylphenols; Span type surfactants composed of sorbitol condensates and various fatty acid esters; Tween type surfactants which are ethers formed between the Span type nonionic surfactants and polyethylene oxide; and copolymers of polyethylene glycol and polypropylene glycol. Those which are difficultly soluble in water, or water-insoluble, and hydrophilic are selected from these nonionic surfactants. Of these, the alkylphenol-type polyethylene glycols, and the copolymer of polyethylene glycol and polypropylene glycol are especially preferred.

The anionic surface active agent should be moderately compatible with the olefin resin; otherwise, there is no particular restriction on it. Examples of suitable anionic surfactants are anionic surfactants of the sodium dodecylbenzenesulfonate type, anionic surfactants of the sodium alkylnaphthalenesulfonate type, and anionic surfactants of the sodium dialkylsulfosuccinate type. Of these, the anionic surfactants of the sodium dodecylbenzenesulfonate type and sodium dialkylsulfosuccinate type are especially preferred.

As a result of using such nonionic and/or anionic surfactants, the resin sheet of this invention does not react with acid or alkali in the electrolytic solution when used as an electrode separator, and the sheet has good affinity with water in the electrolytic solution at the pores of the porous structure. This permits an easy permeation of the electrolytic solution, and reduces the electric resistance of the sheet in the electrolytic solution to a value suitable for electrode separators.

However, if the nonionic and/or anionic surfactant is dissolved in a great amount in the electrolytic solution, it undesirably participates in charging and discharging reactions. Accordingly, the nonionic and/or anionic surfactants should be difficultly soluble in water or insoluble in water and at the same time, be hydrophilic.

The nonionic or anionic surfactant may either be liquid or powdery. The suitable amount of the nonionic and/or anionic surfactants is 0.01 to 30 parts by weight, preferably 0.5 to 20 parts by weight, per 100 parts by weight of the olefin resin.

It is possible to incorporate into the resin sheet of this invention another thermoplastic resin which has relatively poor compatibility with the olefin resin. Examples of such a resin are styrene resins, vinyl chloride resins, polycarbonate resins, saturated polyesters, and phenoxy resins. These resins are added either alone or in combination of two or more.

The addition of such a thermoplastic resin contributes to a greater growth of the porous layered structure, particularly the layered structure, by stretching. The amount of the additional resin is usually 1 to 100 parts by weight, preferably 5 to 50 parts by weight, per 100 parts by weight of the olefin resin.

If desired, the resin sheet of this invention may further include a pigment, a lubricant, a heat stabilizer, a plasticizer, a molding assistant, or an antistatic agent, etc. which, however, do not adversely affect the charging or discharging reaction.

In order to form the resin sheet of this invention, a mixture comprising (a) an olefin resin, (b) a finely divided inorganic substance, and (c) at least one substance selected from the group consisting of water-swellable thermoplastic resins and water-insoluble or difficultly water-soluble hydrophilic nonionic or anionic surface active agents is fabricated into a sheet form. First, the components (a), (b) and (c) and if desired, the above-described additional components, are thoroughly mixed and kneaded by known means using a known device, for example, a pressure-type kneader such as a Bumbury's mixer, a roll mill or an extrusion kneader, and melted, and the molten mixture is fabricated into a sheet using a calender roll. Or they are placed in an extruder with or without prior mixing in a high-speed mixer such as a Henchel mixer or a supermixer. But the fabrication of the mixture is not limited to these specific methods, but any other methods by which the mixture can be fabricated into a sheet can be employed in this invention.

The thickness of the resulting sheet is not particularly restricted, but suitably it is 0.1 to 5 mm in view of the subsequent stretching step. Most suitably, the thickness is 0.2 to 2 mm. The stretching of the resulting sheet is carried out at a temperature below the melting point of the olefin resin. Stretching of the sheet at a temperature at which separation tends to occur at the interface between the finely divided inorganic substance and the olefin resin is effective for the growth of the porous layered structure.

The stretching can be performed uniaxially or in a plurality of directions simultaneously or successively. Any known methods and apparatus can be used to perform the stretching. For example, when the sheet is biaxially stretched in the longitudinal direction and the transverse direction as a typical case of stretching in a plurality of different directions, a tenter stretcher is suitably used.

Preferably, the stretch ratio is at least 1.5 in each direction whether the sheet is stretched or in a plurality of directions. Most suitably, the sheet is stretched at a stretch ratio of at least 2 in each direction. The stretching speed can be varied over a wide range according to the thickness of the sheet and the stretching temperature. However, generally, the suitable stretching speed is 40 cm/min. to 20,000 cm/min.

Thus, there can be formed a porous layered structure in which a plurality of porous layers composed of micropores are laminated. A good porous layered structure can be formed even by stretching uniaxially, but it is very preferred to stretch it in two directions. In particular, it is preferred to perform the stretching in two different directions simultaneously.

In the present invention, the resulting resin having the porous layered structure may be heat-treated. The heat-treatment is carried out at a temperature lower than the melting point of the olefin resin but higher than the stretching temperature. During the heat-treatment, the edge of the resin sheet may be fixed or in a free state. When the sheet is heat-treated in the fixed state, a heat-set effect is imparted to the sheet, and there are brought about advantages such as increased heat dimensional stability, improved smoothness, and some increase in porosity. On the other hand, when it is heat-treated in the free state, a shrinking effect is imparted to the sheet, and there can be obtained advantages such as finer pore diameters, and increased heat dimensional stability. The shrinkage of the sheet should be adjusted to not more than 10% of the original dimension in one direction, preferably not more than 5%. Thus, there is formed a resin sheet having a porous layered structure useful as an electrode separator for electric cells, in which micropores are formed throughout the entire cross section, and thin layers consisting of the micropores are arranged in the laminated state, with at least some of the pores forming open cells.

Electron-microscopic examination of the resin sheet shows that in such a porous layered structure, separation occurs in the interface between the finely divided inorganic substance and the olefin resin, the olefin resin becomes fibrous and forms the wall of the pores, and a multiplicity of thin layers composed of densely arranged such pores are laminated throughout the entire cross section, and in particular, both surface layers of the resin sheet contain denser pores than the inside layers. Most of the pores in the surface layers have a pore diameter of not more than 0.1 micron, and most of those in the inside layers have a pore diameter of 0.1 to 10 microns.

The resin sheet of this invention should have open cells extending from one surface of the sheet to the other, but it is not necessary that all the fine pores formed in the sheet be open cells. It is only sufficient that at least some of them form open cells. Generally, in order to ensure a good passage of the electrolytic solution, the proportion of the open cells should be 40 to 90%, preferably 50 to 90%, of the entire pores of the sheet.

The diameter of the fine pores formed in the sheet is not critical, but suitably it is 0.005 to 20 microns. In order that the sheet permits a good message of the electrolytic solution but does not permit the passage of an active substance, the maximum pore diameter of the open cells is suitably 0.01 to 10 microns preferably 0.01 to 5 microns.

The thickness of the resin sheet can be varied over a wide range according to a particular field in which it is used as an electrode separator for electric cells. Generally, the suitable thickness is 0.01 mm to 10 mm, preferably 0.05 to 5 mm.

The resin sheet of this invention which has been described above in detail meets all the requirements of electrode separators such as:

1. no circuit occurs between electrodes,
2. it does not permit the passage of the particles of an active substance on electrodes,
3. it does not dissolve out noxious substances in the electrolytic solution,
4. it has superior mechanical strength,
5. it has high porosity (as open cells) and high affinity for the electrolytic solution, permitting an easy penetration of the electrolytic solution,
6. it has a low electric resistance in the electrolytic solution, and
7. the electrolytic cell can be made light in weight and small in size.

The resin sheet of this invention therefore finds a wide range of applications as an electrode separator for electric cells of various types, such as a lead cell, an alkali cell or a non-leakage cell.

The resin sheet of this invention has a porous layered structure consisting of a major proportion of open cells extending from one surface of the sheet to the other, and lends itself to a superior passage of the electrolytic solution through these open cells. In addition, these pores are very fine, and do not permit the passage of an active substance at the electrodes. The sheet also has good affinity for the water present in the electrolytic solution because it includes a water-swellable thermoplastic resin or the water-insoluble or difficultly water-soluble hydrophilic nonionic or anionic surface active agent. This leads to a greater improvement of the permeation of the electrolytic solution.

The resin sheet in accordance with this invention has an electric resistance in the electrolytic solution of about 0.0005 ohms/100 cm$^2$/m to 0.005 ohms/100 cm$^2$/mm, which is about ½ to 1/20 of the electric resistances of the conventional electric cells described above.

Furthermore, since the resin sheet of this invention contains the olefin resin as a base and includes the porous layered structure formed as a result of stretching, it possesses superior mechanical strength characteristics such as resistance to flex or impact strength. These characteristics are markedly exhibited even at low temperatures of −30° C to −40° C, and the sheet has superior low temperature characteristics. Accordingly, while the conventional wooden electrode separator is susceptible to breakage by a slight shock, the resin sheet of this invention can provide an electrode separator having markedly improved mechanical strength.

The resin sheet of this invention can fully function as an electrode separator if its thickness is 0.01 to 10 mm. While the conventional electrode separators have a thickness of about 0.4 mm to 2 mm, the thickness of the resin sheet of this invention can be made either smaller or larger according to the use of the electric cells. For example, the resin sheet of larger thickness can give a suitable electric cell free from the leakage of solution, and the resin sheet of smaller thickness makes it possible to reduce the distance between a cathode and an anode as compared with the case of using the conventional electrode separators for electric cells. Accordingly, the electrolytic cells can be made light in weight and small in size, and electric cells suitable for use in electric automobiles can be obtained. The resin sheet of this invention also has superior electric insulation which makes it extremely suitable as an electrode separator.

Another advantage of the resin sheet of this invention is that it has heat-sealability. Furthermore, since it is stretched during manufacture, it has moderate heat-shrinkage properties. Thus, it the resin is made into a bag by heat-sealing and an electrode is placed therein followed by heating, either an anode or a cathode can be sealed in it with the sheet being in intimate contact with the electrode.

Thus, according to this invention, there can be provided an electrode plate for electric cells, wherein at least the reactive surface of the electrode plate is surrounded with the resin sheet described above having the porous layered structure, said sheet being intimately adhered to the reactive surface of the electrode plate.

The electrode plate provided by this invention will be described by reference to a preferred embodiment shown in FIG. 1 of the accompanying drawings.

An electrode plate 4 having an electrode pole 3 is placed in a bag 1 formed from the resin sheet, preferably one having a heat seal part 2 fabricated by utilizing the heat-sealability of the resin sheet, with a part of the electrode pole 3 projecting from the bag 1. By the heat shrinkage of the bag 1, the bag 1 is brought into intimate contact with the electrode plate 4 and thus surrounds it. Consequently, the consumption of the electrode plate due to such causes as the drop-off of an active substance on the surface of the electrode plate, self-discharge, or short-circuit does not occur, and the electrode plate is fully utilized. It is possible therefore to provide an electrode plate for electric cells which permits superior penetration of the electrolytic solution, has a low electric resistance in the electrolytic solution, and is free from the increase of the electric resistance which is caused by gases formed during charging which form bubbles between the surface of the electrode plate and the electrode separator.

Furthermore, the resin sheet of this invention can be suitably used as an electrode sparator for non-leakage-type electric cells. Examples of the conventional non-leakage-type electric cells include one in which glass fibers are laminated in the form of mat on both surfaces of an electrode plate, separator plates are laminated in juxtaposition of these surfaces, and a porous material impregnated with an electrolytic solution is disposed between them, or one in which a formable resin containing a blowing agent is poured in a cell having electrode plates provided at a predetermined position therein, thereby to foam the resin, the formed resin is filled between the electrode plates, and an electrolytic solution is impregnated into the foamed resin.

However, since in the conventional non-leakage-type electric cell, the diffusion of the electrolytic solution is not sufficiently done, the performance of the electric cell tends to be poor. Thus, the electrode plates are seen to shrink or expand at the time of charging or discharging. In addition, the drop-off of an active substance cannot be completely prevented, and the electrode plates tend to be consumed by self-discharge or short-circuit. Furthermore, gases formed at the time of charging become bubbles and adhere to the surfaces of the electrode plates, which results in an increase in the electric resistance of the electrode plates.

The use of the resin sheet of the present invention makes it possible to provide an electrode separator for non-leakage-type electric cells free from such defects.

According to another embodiment of this invention, therefore, there is provided an electrode plate for a non-leakage-type electric cell, the outer surface of said electrode plate being covered with a porous material containing open cells and impregnated with an electrolytic solution, the surface of said porous material being wrapped with the resin sheet of this invention having a porous layered structure, the resin sheet being adhered intimately to the surface of the porous material.

Figure 2:
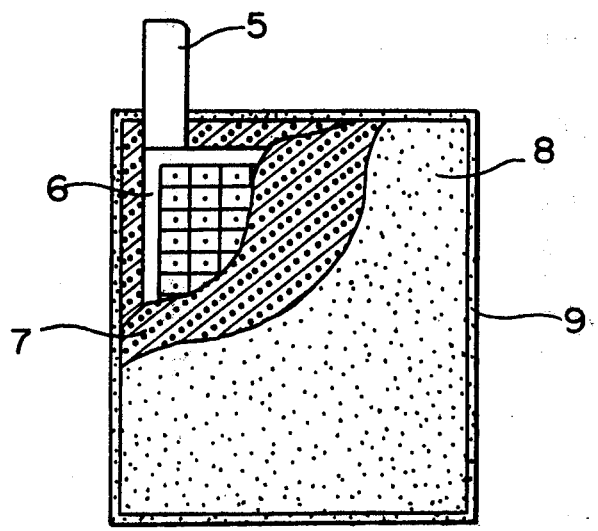

The electrode plate for non-leakage-type electric cells will be described by reference to FIG. 2.

The outer surface of an electrode plate 6 having an electrode pole 5, is covered with a porous material 7, having open cells and impregnated with an electrolytic solution. Suitably, the porous material 7 is made of a foamed product of a synthetic resin such as polyethylene, polypropylene, polyvinyl chloride or polyurethane, sponge, or a microporous rubber, etc. The electrode plate 6 the outer surface of which is covered with the porous material 7 having open cells and impregnated with an electrolytic solution is placed within a bag 8. Preferably, the bag 8 has a heat seal part 9 formed by utilizing the heat-sealability of the resin sheet. In addition, since the sheet for forming the bag 8 is a stretched sheet, it has superior heat shrinkage. By utilizing this property, the resin sheet forming the bag 8 can be brought into intimate contact with the surface of the porous material 7 by heating.

Consequently, a light-weight, small-sized electric cell having far superior properties to the conventional non-leakage-type electric cells can be provided by the present invention.

The following Examples illustrate the present invention in greater detail. In the Examples, all the parts are by weight.

Example 1

| | |
|---|---|
| High density polyethylene (melting point 131° C.) | 100 parts |
| Water-swellable resin of the polyethylene oxide type (AQUAPRENE, product of Meisei Chemical Co., Ltd.) | 30 parts |
| Silica powder (particle diameter less than 10 microns) | 30 parts |
| Diatomaceous earth powder (particle diameter less than 10 microns) | 60 parts |

The above ingredients were kneaded in a Bumbury's mixer, and the kneaded mixture was fed into a vent-type extruder, and extruded into a sheet having a thickness of 0.5 mm through a flat die fitted to its tip. The sheet was then stretched at 90° C on a tenter-type stretcher simultaneously in the longitudinal and transverse directions at a stretch ratio of 3.5 in each direction. This stretching resulted in the formation of a porous layered structure in the sheet.

It was found that a greater part of the micropores of the porous layered structure had a port diameter of 0.1 to 5 microns. The maximum pore diameter of the open cells was 0.6 micron. The resulting sheet having a porous layered structure had a thickness of 0.18 mm, and an apparent density of 0.291. The proportion of the open cells was 65%.

The sheet was interposed between an anode and a cathode of an acidic electric cell, and used as an electrode separator. Each sheet of the electrode separator had an electric resistance of 0.0004 ohms/100 cm² in an electrolytic solution.

The electrode separator was not attacked by the electrolytic solution, and was also found to be suitable for use in alkaline electric cells. The resulting electrode separator permitted superior permeation of the electrolytic solution, and had superior mechanical strength characteristics such as flex resistance.

Example 2

| | |
|---|---|
| Polypropylene (melting point 165° C.) | 100 parts |
| Ethylene-vinyl acetate copolymer | 15 parts |
| Water-swellable acrylic resin ("HYDRON" product of Kyowa Gas Chemical Co., Ltd.) | 30 parts |
| Calcium hydroxide (particle diameter below 10 microns) | 45 parts |

The above ingredients were kneaded for 15 minutes by a kneading roll heated at 170° C., and the kneaded mixture was fed into an extruder, and extruded in to a sheet having a thickness of 0.35 mm through a flat die fitted to its tip. The sheet was cooled to room temperature, and reheated to 115° C. Then, it was stretched simultaneously in the longitudinal and transverse directions at a stretch ratio of 4.0 in each direction to form a porous layered structure in the sheet.

A greater part of the micropores constituting the porous layered structure had a pore diameter of 0.1 to 10 microns. The maximum pore diameter of the open cells was 0.9 micron. The resulting sheet having the porous layered structure had a thickness of 0.08 mm and an apparent density of 0.223. The proportion of the open cells was 60%.

The resulting sheet was interposed between an anode and a cathode of an alkali electric cell, and used as an electrode separator. Each sheet of the electrode separator had an electric resistance of 0.0007 ohms/100 cm² in an electrolytic solution. The electrode separator had superior resistance to alkali and reduction. It also permitted superior permeation of the electrolytic solution, and had superior mechanical strength characteristics such as resistance to flex.

Example 3

| | |
|---|---|
| High density polyethylene (melting point 131° C.) | 100 parts |
| Ethylene/vinyl acetate copolymer | 20 parts |
| Silica fine powder (particle diameter of below 5 microns) | 30 parts |
| Diatomaceous earth powder (particle diameter of below 10 microns) | 30 parts |
| Non-ionic surface active agent of the polyoxyethylene stearate type (NISSAN NONION S-2, the product of Nippon Yushi Kabushiki Kaisha) | 7 parts |

The above ingredients were kneaded in a Bumbury's mixer, and then formed into a sheet having a thickness of 0.4 mm by a calender roll heated at 170° C. While being maintained at 90° C., the sheet was stretched simultaneously in the longitudinal direction at a stretch ratio of 3, and in the transverse direction at a stretch ratio of 3.5 using a tenter-type stretcher, thereby to form a porous layered structure in the sheet.

A greater part of the micropores constituting the porous layered structure had a pore diameter of 0.1 to 5 microns. The maximum pore diameter of the open cells was 0.4 micron. In the resulting sheet, many of the pores were continuous, and extended from one surface of the sheet to the other.

The resulting resin sheet having the porous layered structure had a thickness of 0.20 mm, and an apparent density of 0.231. The proportion of the open cells was 70%.

The sheet obtained was interposed between an anode and a cathode of an acidic electric cell, and used as an electrode separator, but the performance of the electric cell was superior.

Each sheet of electrode separator had an electric resistance of 0.00025 ohms/100 cm² in an electrolytic solution. The tensile strength of the electrode separator was 2.10 kg/mm² in the longitudinal direction, and 1.80 kg/mm² in the transverse direction.

The electrode separator obtained above had superior resistance to acid and alkali, and performed excellent function in both an acid electric cell and an alkaline electric cell. Furthermore, it permitted superior permeation of an electrolytic solution.

Example 4

| | |
|---|---|
| Polypropylene (melting point 170° C.) | 20 parts |
| High density polyethylene (melting point 131° C.) | 80 parts |
| Magnesium hydroxide (particle diameter below 10 microns) | 60 parts |
| Nonionic surfactant of the polypropylene glycol/polyethylene glycol copolymer (NISSAN PRONON No. 201, the product of Nihon Yushi Kabushiki Kaisha) | 5 parts |

The above ingredients were kneaded for 15 minutes by a kneading roll heated at 170° C., and the kneaded mixture was fed into an extruder and extruded into a sheet having a thickness of 0.3 mm through a flat die fitted to its tip. The sheet was stretched simultaneously at 95° C. in the longitudinal and transverse directions at a stretch ratio of 3.5 in each direction, thereby to form a porous layered structure in the sheet.

A greater part of the micropores forming the porous layered structure had a pore diameter of 0.1 to 10 microns, and many of the pores were continuous and extended from one surface of the sheet to the other. The maximum pore diameter of the open cells was 0.9 micron.

The resulting sheet having the porous layered structure had a thickness of 0.12 mm and an apparent density of 0.286. The proportion of the open cells was 65%.

The sheet had superior resistance to alkali, and permitted a superior permeation of an electrolytic solution when used as an electrode separator disposed between an anode and a cathode of an alkaline electric cell.

The electrode separator was immersed in a solution of potassium hydroxide having a specific gravity of 1.3, and its electric resistance was measured. It was found that each sheet of the electrode separator in the electrolytic solution had an electric resistance of 0.0004 ohms/100 cm². The electrode separator further had superior mechanical strength characteristics such as resistance to flex, tensile strength and impact strength.

Example 5

| | |
|---|---|
| Polypropylene (melting point 165° C.) | 100 parts |
| Ethylene/vinyl acetate copolymer | 10 parts |
| Carbon powder (particle diameter below 5 microns) | 15 parts |
| Diatomaceous earth powder (particle diameter below 10 microns) | 70 parts |
| Nonionic surfactant of the sorbitan monostearate type ("SOLGEN No. 50" the product of Daiichi Kyogyo Seiyaku Kabushiki Kaisha) | 10 parts |

The above ingredients were kneaded for 15 minutes by a kneading roll heated at 170° C., and the kneaded mixture was fed into an extruder and extruded into a sheet having a thickness of 0.35 mm through a flat die fitted to its tip. The sheet was stretched at 120° C. simultaneously in the longitudinal and transverse direction at a stretch ratio of 4.0 in each direction, to form a porous layered structure in the sheet. Many of the pores were continuous and extended from one surface of the sheet to the other.

A greater part of the micropores forming the porous structure had a pore diameter of 0.1 to 10 microns. The maximum pore diameter of the open cells was 0.6 micron. The resulting sheet having the porous layered structure had a thickness of 0.08 mm, and an apparent density of 0.223. The proportion of the open cells was 70%.

The sheet had superior resistance to acid and alkali, and could be used with good results as an electrode separator disposed between an anode and a cathode of an acidic or alkaline electric cell. Furthermore, the sheet permitted a superior permeation of an electrolytic solution. The electrode separator was immersed in an electrolytic solution of an acidic electric cell, and its electric resistance was measured. It was found that each resin sheet had an electric resistance of 0.0004 ohms/100 cm².

The electrode separator obtained above further had superior mechanical strength characteristics such as flex resistance, tensile strength or impact strength.

Example 6

| | |
|---|---|
| High density polyethylene (melting point 131° C.) | 100 parts |
| Silica powder (particle diameter below 5 microns) | 50 parts |
| Nonionic surfactant of the polyoxyethylene alkylphenol ether type (NISSAN NOION HS-2045, the product of Nippon Yushi Kabushiki Kaisha) | 10 parts |

The above ingredients were kneaded by a Bumbury's mixer, and the kneaded mixture was fabricated into a sheet having a thickness of 0.5 mm using a calender roll heated at 170° C. While being maintained at 95° C., the sheet was stretched simultaneously in the longitudinal direction at a stretch ratio of 3 and in the transverse direction at a stretch ratio of 3.5 using a tenter-type stretcher, thereby to form a porous layered structure in the sheet.

A greater part of the micropores forming the porous layered structure had a pore diameter of 0.1 to 5 microns. Many of these pores were continuous, and extended from one surface of the sheet to the other. The maximum pore diamter of the open cells was 0.3 micron.

The resulting sheet having the porous layered structure had a thickness of 0.18 mm, and an apparent density of 0.255. The proportion of the open cells was 72%.

The sheet was made into a bag by heat-sealing, and an electrode for an electric cell was placed in it. By the heating of the bag, it shrank and adhered intimately to the electrode. This product was used as an electrode separator for electric cells.

When the electrode separator was immersed in an electrolytic solution for an acidic electric cell, it permitted a superior permeation of the electrolytic solution, but did not permit the passage of an active substance on the electrode. Each sheet of the electrode separator had an electric resistance of 0.00023 ohms/100 cm² in the electrolytic solution.

Furthermore, the electrode separator had superior mechanical strength characteristics such as flex resistance, tensile strength and impact strength.

Example 7

| | |
|---|---|
| High density polyethylene (melting point 131° C.) | 100 parts |
| Ethylene/α-olefin copolymer ("TAFMER" 0860, the product of Mitsui Petroleum Industries, Ltd.) | 20 parts |
| Calcium hydroxide (particle size below 10 microns) | 80 parts |
| Diatomaceous earth (particle size below 10 microns) | 60 parts |
| Non-ionic surfactant of the polypropylene glycol/polyethylene glycol copolymer type ("EBAN" 710, the product of Daiichi Kyogo Seiyaku Kabushiki Kaisha) | 15 parts |

The above ingredients were kneaded by a Bumbury's mixer, and the kneaded mixture was fabricated into a sheet having a thickness of 0.3 mm using a calender roll heated at 170° C. While being mainained at 80° C., the sheet was stretched uniaxially in the longitudinal direction at a stretch ratio of 10 using a stretcher, to form a porous layered structure. Many of the pores were continuous, and extended from one surface of the sheet to the other. A greater part of the pores had a pore diameter of 0.1 to 15 microns. The maximum pore diameter of the open cells was 1.2 microns. The resulting sheet having the porous layered structure had a thickness of 0.1 mm and an apparent density of 0.270. The proportion of the open cells was 50%.

The sheet had superior alkali resistance, and exhibited superior performance as an electrode separator for an alkaline electric cell.

When the electrode separator was immersed in a solution of an alkali hydroxide having a specific density of 1.3 and its electric resistance was measured, it was found to be 0.00045 ohms/100 cm² for each sheet.

Example 8

| | |
|---|---|
| High density polyethylene (melting point 131° C.) | 100 parts |
| Ethylene-vinyl acetate copolymer | 30 parts |
| Fine powder of silica (below 5 microns in diameter) | 20 parts |
| Diatomaceous earth (below 10 microns in diameter) | 90 parts |
| Anionic surfactant of the sodium dialkylsulfosuccinate type | 15 parts |

The above ingredients were fed into a Bumbury's mixer, and kneaded. The kneaded mixture was formed into a sheet having a thickness of 0.4 mm using a calendar roll heated at 175° C. While being maintained at 85° C., the sheet was simultaneously stretched in the longitudinal direction at a stretch ratio of 4 and in the transverse direction at a stretch ratio of 5 using a tenter stretcher, thereby to form a porous layered structure in the sheet.

A greater part of the fine pores forming the porous layered structure had a pore diameter of 0.1 to 7 microns, and the maximum pore diameter of the open cells was 0.3 micron.

The sheet so obtained and including the porous layered structure had a thickness of 0.15 mm and an apparent density of 0.23. The proportion of the open cells was 75%.

Each sheet so obtained had an electric resistance of 0.00023 ohm/100 cm² in an electrolytic solution.

When used as an electrode separator, the resin sheet obtained had superior resistance to acid and alkali, and in both of an acidic electric cell and an alkali electric cell, the sheet became an excellent electrode separator having far superior discharge capacity and electricity generating efficiency to the conventional pulp separators. Using this separator, an electric cell having markedly improved low temperature characteristics could be produced.

Example 9

| | |
|---|---|
| High density polyethylene (melting point 131° C.) | 100 parts |
| Ethylene-propylene copolymer | 15 parts |
| Phenoxy resin | 12 parts |
| Fine powder of silica (below 5 microns in diameter) | 40 parts |
| Potassium hydroxide (below 10 microns in diameter) | 55 parts |
| Water-swellable resin of the polyethylene oxide type | 35 parts |
| Nonionic surfactant of the polypropylene glycol-polyethylene glycol copolymer | 10 parts |

The above ingredients were kneaded for 15 minutes using a kneading roll heated at 165° C. The kneaded mixture was fed into an extrusion molding machine, and fabricated into a sheet having a thickness of 0.5 mm through a flat die. While being maintained at 88° C., the sheet was simultaneously stretched in the longitudinal and transverse directions at a stretch ratio of 4.5 in each direction, to form a porous layered structure.

A greater part of the fine pores forming the porous layered structure had a pore diameter of 0.1 to 10 microns, and the maximum pore diameter of the open cells was 0.7 microns. The proportion of the open cells was 65%.

The sheet had a thickness of 0.14 mm, an apparent density of 0.272, and an electric resistance, in an electrolytic solution, of 0.0003 ohm/100 cm² for each sheet. This sheet exhibited good performance especially when used as an electrode separator for an alkali electric cell. It greatly increased the number of charging and discharging cycles, and contributed to the long lifetime of the alkali electric cell.

Example 10

The electrode separator obtained in Example 8 was formed into a bag by heat-sealing, and an electrode for electric cells which was sandwiched by porous open-cellular polyvinyl chloride materials (each having a thickness of about 3 mm) was placed in the bag. The electrode separator was brought into intimate contact with the open-cellular materials by heat shrinkage. A lead sulfate electric cell was constructed using such electrodes. An electrolytic solution was impregnated fully into the open-cellular materials. The electrolytic solution was poured into it until the electrolytic solution in the free state was about to be observed. Even when vigorous vibration was imparted to this electric cell, the electrolytic solution did not leak out. It had a long charging and discharging cycle, and exhibited superior performance.

Example 11

| | |
|---|---|
| Polypropylene (melting point 165° C.) | 100 Parts |
| Ethylene-ethyl acrylate copolymer | 25 parts |
| Polycarbonate | 13 parts |
| Diatomaceous earth | 80 parts |

Example 11-continued

| | |
|---|---|
| (below 10 microns in diameter) Anionic surfactant of the sodium alkylnaphthalenesulfonate | 12 parts |

The above ingredients were kneaded for 15 minutes using a kneading roll heated at 170° C., and formed into a sheet having a thickness of 0.6 mm using an extruder. While being maintained at 120° C., the sheet was stretched simultaneously in the longitudinal and transverse direction at a stretch ratio of 4 in each direction, to form a porous layered structure.

A greater part of the micropores forming the porous structure had a pore diameter of 0.1 to 10 microns, and the maximum pore diameter of the open cells was 0.9 micron. The proportion of the open cells was 68%. The sheet had a thickness of 0.35 mm, an apparent density of 0.320, and an electric resistance, in an electrolytic solution, of 0.00029 ohm/100 cm² for each sheet.

When used as an electrode separator, this sheet was superior dimensional stability under heat, and was suitable for use in electric cells used in an environment where temperature conditions were variable. It had high performance, and good stability.

The electrode separator so obtained was heat sealed into a bag, and an electrode was placed in it. It was then heated to 130° C. to allow it to shrink, whereby it adhered intimately to the electrode. The electrode separator when used in an electric cell including this electrode permitted superior permeation of the electrolytic solution, and its electric resistance was not decreased in spite of the fact that it had been shrunken. The electrode separator obtained in this Example was thin and could be used in the form of bag and in intimate contact with the electrode, the space between the electrodes could be made smaller than in the conventional electric cells, and the electric cell could be made smaller in size than the conventional ones in spite of having the same electric capacity.

What we claim is:
1. A process for preparing a resin sheet having a porous structure useful as an electrode separator for electric cells, which consists essentially of fabricating into a sheet a mixture consisting essentially of (a) 100 parts by weight of an olefin resin, (b) 5 to 300 parts per 100 parts by weight of the olefin resin of a finely divided inorganic substance and (c) at least one substance selected from the group consisting of (i) 3 to 100 parts by weight per 100 parts of the olefin resin of a water-swellable thermoplastic resin or (ii) 0.01 to 30 parts by weight per 100 parts by weight of the olefin resin of a water-insoluble or difficultly water-soluble hydrophilic nonionic surface active agent and stretching the resulting sheet in at least one direction to such an extent that the sheet contains fine pores arranged throughout its cross section, the diameter of said pores being 0.005 to 20 microns and 40 to 90% of the pores being open cells of which the maximum pore diameter is 0.01 to 10 microns.

2. The process of claim 1 wherein said sheet is stretched in at least one direction at a stretch ratio of 1.5 in each direction.

3. The process of claim 1 wherein said stretching is carried out at a temperature which is above the softening point of said olefin resin but below its melting point.

4. The process of claim 1 wherein after stretching, the stretched sheet is heat-treated at a temperature lower than the melting point of said olefin resin but higher than the stretching temperature.

5. A processing according to claim 1, wherein components (a), (b) and (c) are thoroughly mixed and kneaded in a mixer and then fabricated into sheet form.

6. A process according to claim 5, wherein the mixture is extruded into a sheet.

7. A process according to claim 1, wherein the substance (c) is a water-swellable thermoplastic resin.

8. A process according to claim 1, wherein the substance (c) is a water-insoluble or difficultly water-soluble hydrophilic nonionic surface active agent.

* * * * *